(12) United States Patent
Hutchinson

(10) Patent No.: US 12,466,248 B1
(45) Date of Patent: Nov. 11, 2025

(54) AUTOMOTIVE SWIMWEAR

(71) Applicant: Jacqueline A. Hutchinson, Bradenton, FL (US)

(72) Inventor: Jacqueline A. Hutchinson, Bradenton, FL (US)

( * ) Notice: Subject to any disclaimer, the term of this patent is extended or adjusted under 35 U.S.C. 154(b) by 106 days.

(21) Appl. No.: 18/106,369

(22) Filed: Feb. 6, 2023

(51) Int. Cl.
*B60J 11/04* (2006.01)

(52) U.S. Cl.
CPC ............................. *B60J 11/04* (2013.01)

(58) Field of Classification Search
CPC ................................................ B60J 11/04
See application file for complete search history.

(56) References Cited

U.S. PATENT DOCUMENTS

| | | | | |
|---|---|---|---|---|
| 2,366,600 | A | | 1/1945 | Thomas |
| 3,145,041 | A | * | 8/1964 | Grolig .................. A47G 25/902 81/488 |
| 4,938,522 | A | * | 7/1990 | Herron ..................... B60J 11/00 150/166 |
| 5,100,191 | A | * | 3/1992 | Detrick ................ A47G 25/902 294/3.6 |
| 5,584,737 | A | * | 12/1996 | Luhtala ..................... F41H 1/02 2/2.5 |
| 6,405,862 | B1 | * | 6/2002 | Allain ....................... B63C 7/06 206/335 |
| 6,517,141 | B1 | * | 2/2003 | Su ............................ B60J 11/00 150/166 |
| 6,547,313 | B2 | | 4/2003 | Syron |
| 9,061,808 | B2 | | 6/2015 | Echauz |
| 9,499,035 | B1 | | 11/2016 | Chashchukhin |
| 10,035,412 | B2 | | 7/2018 | Garnick et al. |
| 10,500,935 | B2 | | 12/2019 | Garnick et al. |
| 10,800,240 | B2 | | 10/2020 | Cassell |
| 10,801,228 | B1 | | 10/2020 | Dallas |
| D927,401 | S | | 8/2021 | Fang |
| 11,292,541 | B2 | * | 4/2022 | Dooling .................... B62J 19/00 |
| 2020/0290776 | A1 | * | 9/2020 | Iha .......................... B65D 37/00 |

FOREIGN PATENT DOCUMENTS

| | | | | |
|---|---|---|---|---|
| FR | 2629764 | A1 | * | 4/1988 |
| GB | 2238029 | A | * | 5/1991 .............. B60J 11/00 |

* cited by examiner

*Primary Examiner* — Tri M Mai
(74) *Attorney, Agent, or Firm* — Cramer Patent & Design; Aaron R. Cramer

(57) ABSTRACT

The Automotive Swimwear is an apparatus that is designed to protect parked motor vehicles during flooding. The device takes the form of a large wetsuit, made from neoprene textile, silnylon textile, nylon textile, and similar textiles that are waterproof. The wetsuit has at least one waterproof zipper. This allows the wetsuit to be opened and laid flat upon a driveway, parking lot or similar surface. The motor vehicle is then driven onto the wetsuit, and the remaining sides are pulled up and over the car until it is completely enclosed. The waterproof zipper mechanism is then closed. Regions upon which the tires of the motor vehicle rests are made from a thinner durable vinyl material. An accessory pocket and plurality of weights having an exterior reflective material are also provided.

1 Claim, 3 Drawing Sheets

AUTOMOTIVE SWIMWEAR

RELATED APPLICATIONS

None.

FIELD OF THE INVENTION

The present invention relates generally to a vehicle protection device and more specifically to a vehicle protection device that acts like a wetsuit/article of swimwear.

BACKGROUND OF THE INVENTION

Recent events in our nation's history have chronicled the weakness of mankind when it comes to the forces of nature, especially that of water. Newspapers, magazines and news programs are filled with images of flood waters from one foot to three feet and even up to twenty feet and higher. While sandbags, pumps and the like may offer some help for homes and building structures, and low levels of flooding can allow the repair of homes and businesses, when it comes to motor vehicles, even mild flooding can be disastrous.

This is ironic when one considers that such vehicles can be moved from the path of rising water, but if no place is available to move them, nothing can be done. Accordingly, there is a need for a means by which motor vehicles such as cars, trucks and the like can be easily protected from rising flood waters in a simple and cost-effective manner. The development of the Automotive Swimwear fulfills this need in a manner that is cost effective, efficacious, and easy.

SUMMARY OF THE INVENTION

To achieve the above and other objectives, the present invention provides for an automotive swimwear is a vehicle wetsuit having a center panel, a left side panel, a right-side panel, a front-end panel, and a rear end panel, the vehicle wetsuit is adapted to enwrap a vehicle to protect the vehicle from damage. The vehicle wetsuit may be made of one or more layers of a flexible and waterproof material. The vehicle wetsuit may be wrapped around the vehicle while the vehicle wetsuit is spread out flat and the vehicle is parked on top of the vehicle wetsuit.

The vehicle wetsuit may be sealed using a zipper once wrapped around the vehicle. The zipper may be covered by a cover flap which is held closed by a hook-and-loop fastener. A zipper stick may be a staff with a hook coupled to the distal end of the staff that is adapted to be held by a user in order to pull the zipper with the hook. The vehicle wetsuit may include a zipper stick pocket to store the zipper stick when the zipper stick is not in use.

The left side panel may be coupled to the left edge of the center panel and the right-side panel is coupled to the right edge of the center panel. The front-end panel may be coupled to the front edge of the center panel and the rear end panel is coupled to the rear edge of the center panel. The center panel may include a plurality of wheel subpanels.

The wheel subpanels may include a plurality of rectangular areas that are positioned under each of the vehicle wheels. The wheel subpanels may be adapted to deform as the vehicle wetsuit is pulled up around the vehicle such that the wheel subpanels become pockets into which the vehicle wheels fit. The wheel subpanels may deform as the vehicle wetsuit is pulled up due to a different material used to make the wheel subpanels. The wheel subpanels may deform as the vehicle wetsuit is pulled up due to a different thickness of the material in the wheel subpanels. The wheel subpanels may be pre-formed to include one or more bulges that become the pockets for the vehicle wheels as the vehicle wetsuit is pulled up. The left side panel may be a flap of material that is coupled to the left edge of the center panel that is folded up and over the left side of the vehicle. The right-side panel is a flap of material that is coupled to the right edge of the center panel that is folded-up and over the right side of the vehicle.

The front-end panel may be a flap of material that is coupled to the front edge of the center panel folded up and over the front end of the vehicle. The rear end panel may be a flap of material that is coupled to the rear edge of the center panel that is folded up and over the rear end of the vehicle. The rear end panel may be fitted to match the contours of the rear end of the vehicle.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
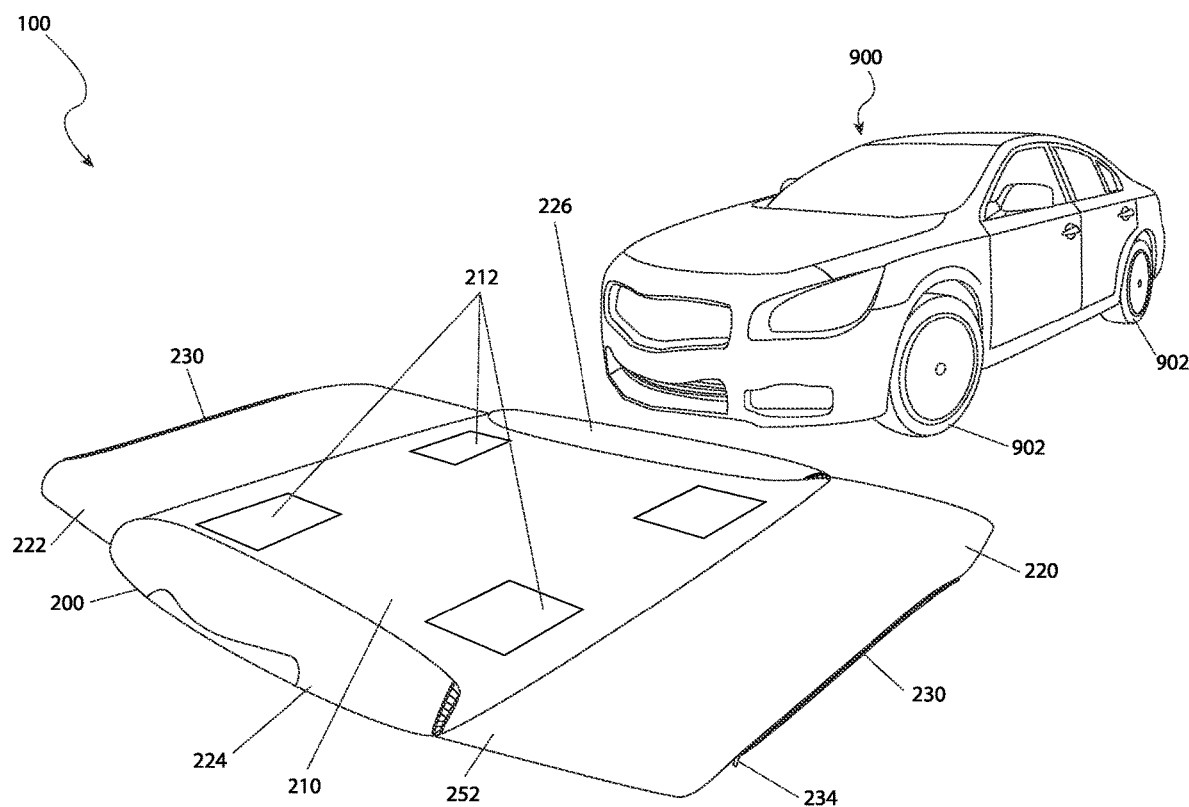
FIG. 1 is an isometric view of automotive swimwear, according to an embodiment of the present invention, illustrating the vehicle wetsuit positioned in front of a vehicle in preparation for installation.
Figure 2:
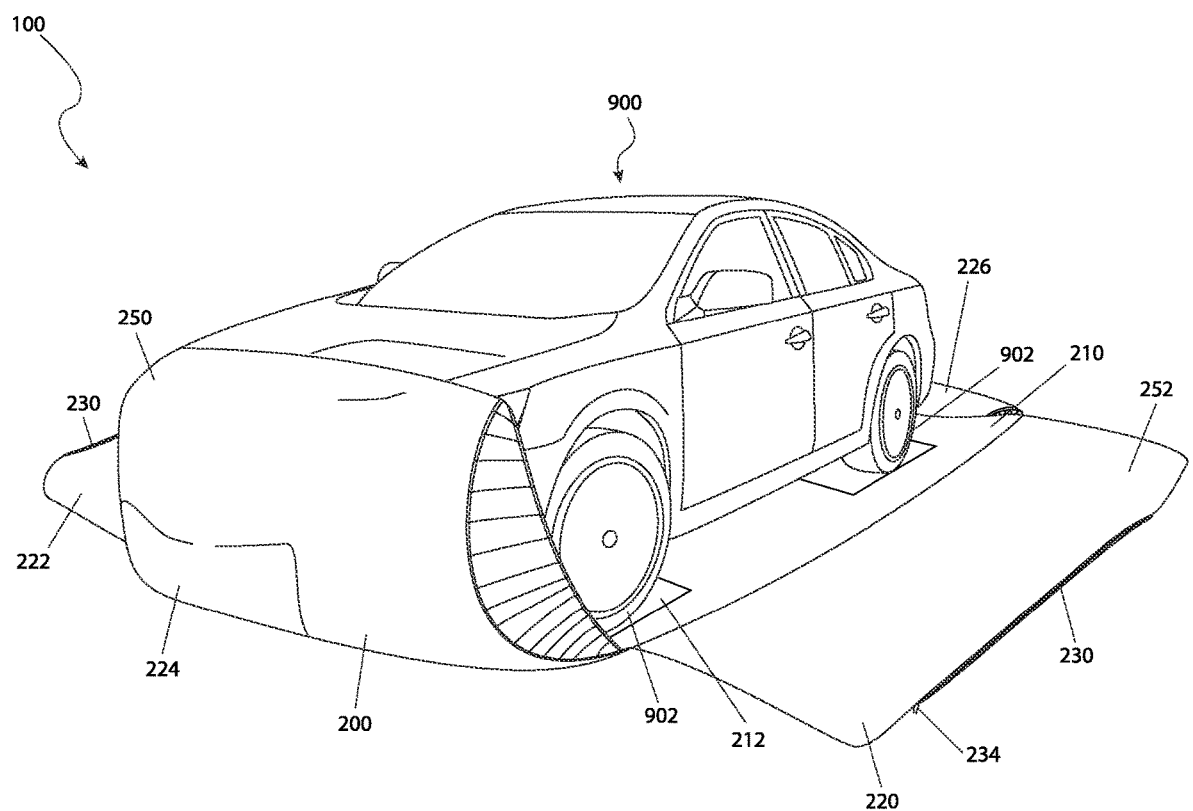
FIG. 2 is an isometric in-use view of automotive swimwear, according to an embodiment of the present invention, illustrating the vehicle positioned on top of the wetsuit.
Figure 3:
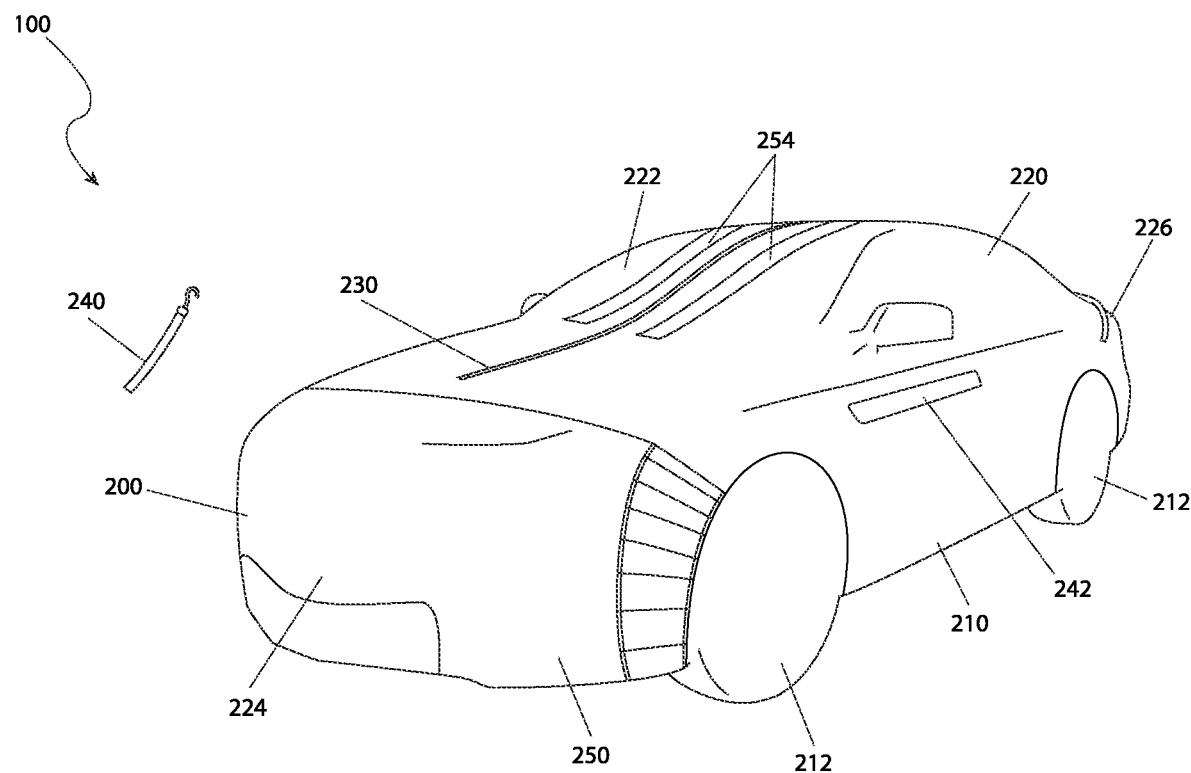
FIG. 3 is an isometric in-use view of automotive swimwear, according to an embodiment of the present invention, illustrating the wetsuit wrapped around the vehicle.

DESCRIPTIVE KEY 100 automotive swimwear
200 vehicle wetsuit
210 center panel
212 wheel subpanel
220 left side panel
222 right side panel
224 front end panel
226 rear end panel
230 zipper
234 zipper pull
240 zipper stick
242 zipper stick pocket
250 outer layer
252 inner layer
254 reflector
900 vehicle
902 vehicle wheel 1. Description of the Invention The present invention is directed to automotive swimwear (herein described as the "invention") 100. The invention 100 may comprise a vehicle wetsuit 200 that may be used to enwrap a vehicle 900. The vehicle wetsuit 200 may be a waterproof covering for the vehicle 900. The vehicle wetsuit 200 may protect the vehicle 900 from damage. As non-limiting examples, the vehicle 900 may be a car, a motorcycle, a pickup truck, a bus, or an emergency vehicle and the damage may be due to flooding, snow, ice, hail, sun, or wind-blown debris. The vehicle wetsuit 200 may be adapted to be installed and removed by one person.

The vehicle wetsuit 200 may be made of one (1) or more layers of a flexible, waterproof material. The vehicle wetsuit 200 may be wrapped around the vehicle 900 while the vehicle wetsuit 200 is spread out flat and the vehicle 900 is parked on top of the vehicle wetsuit 200. The vehicle wetsuit 200 may be sealed using a zipper 230 once wrapped around the vehicle 900.

The vehicle wetsuit 200 may comprise a center panel 210, a left side panel 220, a right-side panel 222, a front-end panel 224, and a rear end panel 226. The center panel 210 may be substantially rectangular. The left side panel 220 may be coupled to the left edge of the center panel 210 and the right side panel 222 may be coupled to the right edge of the center panel 210. The front-end panel 224 may be coupled to the front edge of the center panel 210 and the rear end panel 226 may be coupled to the rear edge of the center panel 210.

The center panel 210 may comprise plurality of wheel subpanels 212. The wheel subpanels 212 may be rectangular areas that may be positioned under each of the vehicle wheels 902. The wheel subpanels 212 may deform as the vehicle wetsuit 200 is pulled up around the vehicle 900 such that the wheel subpanels 212 become pockets into which the vehicle wheels 902 fit. In some embodiments, the wheel subpanels 212 may deform as the vehicle wetsuit 200 is pulled up due to a different material used to make the wheel subpanels 212. In some embodiments, the wheel subpanels 212 may deform as the vehicle wetsuit 200 is pulled up due to a different thickness of the material in the wheel subpanels 212. In some embodiments, the wheel subpanels 212 may be pre-formed to comprise bulges that become the pockets for the vehicle wheels 902 as the vehicle wetsuit 200 is pulled up.

The left side panel 220 may be a flap of material that is coupled to the left edge of the center panel 210. The left side panel 220 may be folded up and over the left side of the vehicle 900.

The right-side panel 222 may be a flap of material that is coupled to the right edge of the center panel 210. The right-side panel 222 may be folded up and over the right side of the vehicle 900.

The front-end panel 224 may be a flap of material that is coupled to the front edge of the center panel 210. The front end panel 224 may be folded up and over the front end of the vehicle 900. In some embodiments, the front-end panel 224 may be fitted to match the contours of the front end of the vehicle 900.

The rear end panel 226 may be a flap of material that is coupled to the rear edge of the center panel 210. The rear end panel 226 may be folded up and over the rear end of the vehicle 900. In some embodiments, the rear end panel 226 may be fitted to match the contours of the rear end of the vehicle 900.

In some embodiments, the front-end panel 224 and the rear end panel 226 may be folded up over the vehicle 900 and then the left side panel 220 and the right-side panel 222 may be folded up and over the vehicle 900. The left side panel 220 and the right-side panel 222 thereby cover the distal ends of the front-end panel 224 and the rear end panel 226 and hold the front-end panel 224 and the rear end panel 226 in place.

The zipper 230 may couple the distal end of the left side panel 220 to the distal end of the right-side panel 222 on the top of the vehicle 900. The zipper 230 may be covered by a cover flap which may be held closed by a hook-and-loop fastener. The zipper 230 and/or the hook-and-loop fastener may be waterproof.

In some embodiments, the invention 100 may comprise a zipper stick 240. The zipper stick 240 may be a staff with a hook coupled to the distal end of the staff. The proximal end of the zipper stick 240 may be adapted to be held by a user in order to pull a zipper pull 234 with the hook. The vehicle wetsuit 200 may comprise a zipper stick pocket 242 to store the zipper stick 240 when the zipper stick 240 is not in use.

The dimensions of the vehicle wetsuit 200 may be selected to fit one (1) particular model of vehicle or one (1) family of similarly sized vehicles. Therefore, the vehicle wetsuit 200 may be available in a number of different sizes to fit a variety of vehicles. The dimensions that may vary may comprise the length and width of the center panel 210, the left side panel 220, the right-side panel 222, the front-end panel 224, and the rear end panel 226, the size of the wheel subpanels 212, and the location of the wheel subpanels 212.

In some embodiments, the vehicle wetsuit 200 may comprise an outer layer 250 of material and an inner layer 252 of material that are bonded together. The outer layer 250 may be exposed when the vehicle wetsuit 200 is installed on the vehicle 900 and the inner layer 252 may be pressed against the vehicle 900. The outer layer 250 may be a flexible material that is durable and waterproof. The outer layer 250 may stretch when a stretching force is applied to the vehicle wetsuit 200. The inner layer 252 may be a microfiber to protect the vehicle 900 from scratches.

The outer layer 250 may comprise a color that enhances the visibility of the vehicle wetsuit 200. As non-limiting examples, the outer layer 250 may be orange, yellow, yellow-green, or fluorescent version of those colors.

To further enhance visibility, the vehicle wetsuit 200 may comprise one (1) or more reflectors 254. The reflectors 254 may be coupled to one (1) or more positions of the outer layer 250 on the front end panel 224, the rear end panel 226, the left side panel 220, the right side panel 222, or any combination thereof.

In use, the vehicle wetsuit 200 may be spread out flat with the outer layer 250 down and the vehicle 900 may be driven onto the vehicle wetsuit 200 such that the vehicle wheels 902 are positioned on the wheel subpanels 212. Any stones or other debris tracked onto the vehicle wetsuit 200 by the vehicle wheels 902 may be brushed off of the vehicle wetsuit 200. The front end panel 224 and the rear end panel 226 may be pulled up onto the vehicle 900 as far as possible. The left side panel 220 and the right side panel 222 may be pulled up onto the vehicle 900 until they meet. The zipper 230 may be started while the zipper pull 234 is low-typically above the hood or the trunk—and the zipper stick 240 may be used to close the zipper 230 by pulling the zipper pull 234 over the top of the vehicle 900.

The invention 100 has been described here as applied to a car; however, those of ordinary skill in the art will recognize modifications that may be appropriate for the invention 100 to be installed on other types of vehicles. Such modifications may comprise changes to dimensions, changes to the number and placement of the plurality of wheel subpanels 212, changes to the placement of the zipper 230, or any combination thereof. Those of ordinary skill in the art will further recognize that such modifications will fall within the spirit and scope of the present invention as defined in the following claims. Accordingly, the invention is to be limited only by the scope of the following claims and their equivalents.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An automotive swimwear device comprising:
  a center panel configured to be positioned under a vehicle, the center panel including a plurality of wheel subpanels configured to deform into pockets for enclosing vehicle wheels when the automotive swimwear device is pulled up around the vehicle;
  a left side panel coupled to a left edge of the center panel and configured to be folded up and over a left side of the vehicle;
  a right side panel coupled to a right edge of the center panel and configured to be folded up and over a right side of the vehicle;
  a front end panel coupled to a front edge of the center panel and configured to be folded up and over a front end of the vehicle;
  a rear end panel coupled to a rear edge of the center panel and configured to be folded up and over a rear end of the vehicle;
  a zipper configured to couple a distal end of the left side panel to a distal end of the right side panel across a top portion of the vehicle to secure the automotive swimwear device in place;
  an outer layer made of a flexible, durable, and waterproof material, the outer layer being stretchable under applied force and comprising a high-visibility color;
  an inner layer bonded to the outer layer, the inner layer comprising a microfiber material configured to protect the vehicle from scratches;
  one or more reflectors coupled to the outer layer at one or more positions on the front end panel, rear end panel, left side panel, or right side panel to enhance visibility;
  a zipper stick comprising a staff with a hook at a distal end thereof, the zipper stick being configured to assist in pulling a zipper pull across the top portion of the vehicle;
  a zipper stick pocket coupled to the automotive swimwear device and configured to store the zipper stick when not in use;
  wherein the automotive swimwear device is configured to protect the vehicle from damage caused by flooding, snow, ice, hail, sun, or wind-blown debris;
  wherein the automotive swimwear device is adapted to be installed and removed by a single person; and
  wherein the automotive swimwear device is configured to fit a specific model of vehicle or a family of similarly sized vehicles, with varying dimensions of the center panel, side panels, end panels, and wheel subpanels to accommodate the selected vehicle size.

* * * * *